United States Patent [19]

Rohra et al.

[11] Patent Number: 4,693,616
[45] Date of Patent: Sep. 15, 1987

[54] BEARING FOR A FLUID FLOW ENGINE AND METHOD FOR DAMPING VIBRATIONS OF THE ENGINE

[75] Inventors: Alois Rohra; Walter Wildner, both of Munich, Fed. Rep. of Germany

[73] Assignee: MTU Motoren-und Turbinen-Union Muenchen GmbH, Munich, Fed. Rep. of Germany

[21] Appl. No.: 905,784

[22] Filed: Sep. 9, 1986

[30] Foreign Application Priority Data

Sep. 11, 1985 [DE] Fed. Rep. of Germany ....... 3532456

[51] Int. Cl.$^4$ ............................................ F16C 39/04
[52] U.S. Cl. ...................................................... 384/99
[58] Field of Search ................. 384/99, 465, 316, 472, 384/476, 564, 571

[56] References Cited

U.S. PATENT DOCUMENTS

| | | | |
|---|---|---|---|
| Re. 31,394 | 9/1983 | Streifert | 384/99 |
| 3,243,243 | 3/1966 | Diver et al. | 384/465 |
| 3,393,024 | 7/1968 | Rhodes et al. | 384/316 |
| 4,527,910 | 7/1985 | Fleming | 384/99 |

OTHER PUBLICATIONS

Construction, Nr. 37, Vol. 8, 1985, pp. 301 to 308 (1985).
Journal of Engineering for Power, Transactions of ASME, vol. 99, Series A, Nr. 1, Jan. 1977, pp. 47-52.
Journal of Engineering for Power, Transactions of ASME, vol. 100, Jul. 1978, pp. 558-562.

*Primary Examiner*—Lenard A. Footland
*Attorney, Agent, or Firm*—W. G. Fasse; D. H. Kane, Jr.

[57] ABSTRACT

A bearing arrangement between shafts of a fluid flow engine, especially including a high pressure turbine and/or a lower pressure turbine, includes a damping gap for the controllable formation of a carrier film between an outer bearing race and a bearing mounting member. A damping fluid is introduced into the damping gap of a squirrel cage bearing. The outer bearing race rotates with an r.p.m. corresponding to that of the high pressure turbine shaft r.p.m. or to that of the low pressure turbine shaft r.p.m. The damping fluid is supplied through a channel passing through the low pressure turbine shaft and into an entrapment chamber just at the entrance end of the damping gap, whereby the rotation of the entrapment chamber compresses the damping fluid by a centrifugal force into the damping gap.

12 Claims, 3 Drawing Figures

BEARING FOR A FLUID FLOW ENGINE AND METHOD FOR DAMPING VIBRATIONS OF THE ENGINE

FIELD OF THE INVENTION

The invention relates to a bearing for a fluid flow engine and to a method for damping engine vibrations. The bearing is especially suitable for high pressure or low pressure turbines employing a carrier film for damping purposes.

DESCRIPTION OF THE PRIOR ART

The bearing mounting of the high pressure turbine shaft on the side of the turbine may be accomplished in different ways in connection with the construction of power plants. The bearing required for supporting the high pressure turbine shaft may, for example, be arranged in a housing located between the high pressure turbine and the low pressure turbine. Such location of the bearing is referred to as the hot strut location. In the alternative, the bearing may be located between the shafts of the high pressure turbine and the low pressure turbine, in which case the bearing is a so-called intershaft damping bearing. The last type of bearing, namely the so-called intershaft bearing, is frequently preferred in order to avoid a bearing housing in the so-called "hot" zone between the high pressure turbine and the low pressure turbine. The so-called intershaft damping bearing can be located in a bearing housing downstream of the low pressure turbine. This location has the advantage that the housing is located in the cooler zone of the gas flow.

Such an intershaft damping bearing has heretofore frequently been constructed in known power plants as a so-called "rigid bearing".

In other words, the outer bearing ring or race is rigidly connected to the high pressure turbine shaft and the inner bearing ring or race is rigidly connected to the low pressure turbine shaft.

In the rigid type arrangement of the intermediate shaft bearing there is a mutual influence between the vibration characteristics of the high pressure system and the vibration characteristics of the low pressure system and vice versa. In other words, all types of vibrations that may be caused by an unbalance and by a self-excitation are transmitted directly from one system into the other and vice versa. The possibilities of tuning both vibration systems to each other are very limited.

Generally, it is the low pressure turbine shaft or rather its vibration characteristic that causes problems. One possibility of improving the critical vibration or r.p.m. characteristic is known in that the diameter of the low pressure turbine shaft is increased. This approach, however, has significant disadvantages with regard to the high pressure turbine disk because the larger shaft diameter requires a larger hub bore in the high pressure turbine disk which in turn leads to a substantially higher stress level in the disk.

The publication "Construction", No. 37, Vol. 8, 1985, pages 301 to 308 describes under the heading "Characteristic Curves of Real Squeeze Film Dampers" so-called squeeze film bearings which are so constructed that a ring gap is formed between the bearing housing and an outer bearing race. The ring gap is filled with oil under pressure to function as a damper. The oil under pressure is supplied into the ring gap through bores in the housing.

Two articles by Hibner et al that appeared in the "Journal of Engineering for Power", Transactions of ASME, Vol. 99, Series A, No. 1, January 1977, pages 47 to 52; and in Vol. 100, July 1978, pages 558 to 562, describe an analytical and experimental investigation of the stability of intershaft squeeze film dampers. Hibner et al investigated a dynamic simulation of a gas turbine engine having a low rotor section and a high rotor section. The so-called squeeze fluid film was located between the low rotor shaft and the inner race of the bearing supporting the high rotor mass on the low rotor shaft, please see FIGS. 4 and 9 of the first mentioned article.

According to these articles the instability resulting from the placement of the squeeze fluid film between the low rotor shaft and the inner bearing race of the high rotor mass was controlled by a spring arranged in parallel to the squeeze film damper, whereby the cantilever natural frequency was raised beyond the low rotor maximum speed, thereby eliminating the instability.

It has been found that such a spring arrangement is undesirable since it is cumbersome and expensive. Such solution does not make any suggestion that the spring system can be avoided altogether.

OBJECTS OF THE INVENTION

In view of the foregoing it is the aim of the invention to achieve the following objects singly or in combination:

to influence the vibration characteristics of the bearing system of a fluid flow engine in a manner which does not require enlarged low pressure turbine shaft diameters nor spring systems;

to avoid or at least reduce the above mentioned types of vibrations or oscillations by damping the rotor bearings, more specifically, to provide a damping device which is well suitable for an intermediate shaft bearing or so-called intershaft bearing; and to employ a modified squeeze film bearing as a damping device in a gap filled with oil between two bearing parts either of the shaft of the high pressure turbine or of the low pressure turbine.

SUMMARY OF THE INVENTION

The invention is based on the recognition that the damping principle using squeeze film techniques should be suitable for use in rotating bearings such as an intermediate shaft bearing. For this purpose it is necessary, according to the invention, to provide a damping gap filled with oil within one shaft, either the high pressure turbine shaft or the low pressure turbine shaft, and to continuously supply this damping gap with the required oil under pressure for achieving the desired damping effect.

According to the invention the foregoing purposes are achieved in two ways. A squirrel cage bearing having an outer ring or race and and an inner ring or race is used in both instances. In the first embodiment the squirrel cage bearing is secured with its outer ring or race to the high pressure turbine shaft and is mounted with its inner ring or race on the low pressure turbine shaft. The squirrel cage bearing thus forms an intermediate bearing and its outer ring or race forms with a mounting member connected to the high pressure turbine shaft, a ring gap which is filled with oil under pressure.

In the second embodiment the outer race or ring of the squirrel cage bearing forming an intermediate bearing is connected to the low pressure turbine shaft while the inner race or ring of the squirrel cage bearing forming said intermediate bearing is mounted on the high pressure turbine shaft. In this embodiment the outer race of the squirrel cage bearing forms a ring gap with a mounting member connected to the low pressure turbine shaft and the gap is also filled with oil.

In both instances the fluid needed for filling the ring gap is taken from the bearing lubricating oil supply. For this purpose, a ring space is formed by a ring lip and by the facing side or end of the bearing. The oil is trapped in this ring space and the rotation of the shafts causing a centrifugal force presses the oil into the ring gap. Hence, this ring space is also referred to as an entrapment chamber for the damping fluid which need not be lubricating oil.

BRIEF DESCRIPTION OF THE DRAWINGS

In order that the invention may be clearly understood, it will now be described, by way of example, with reference to the accompanying drawings, wherein:

FIG. 3 shows a special flow control ring for the present purposes.

DETAILED DESCRIPTION OF PREFERRED EXAMPLE EMBODIMENTS AND OF THE BEST MODE OF THE INVENTION

Figure 1:
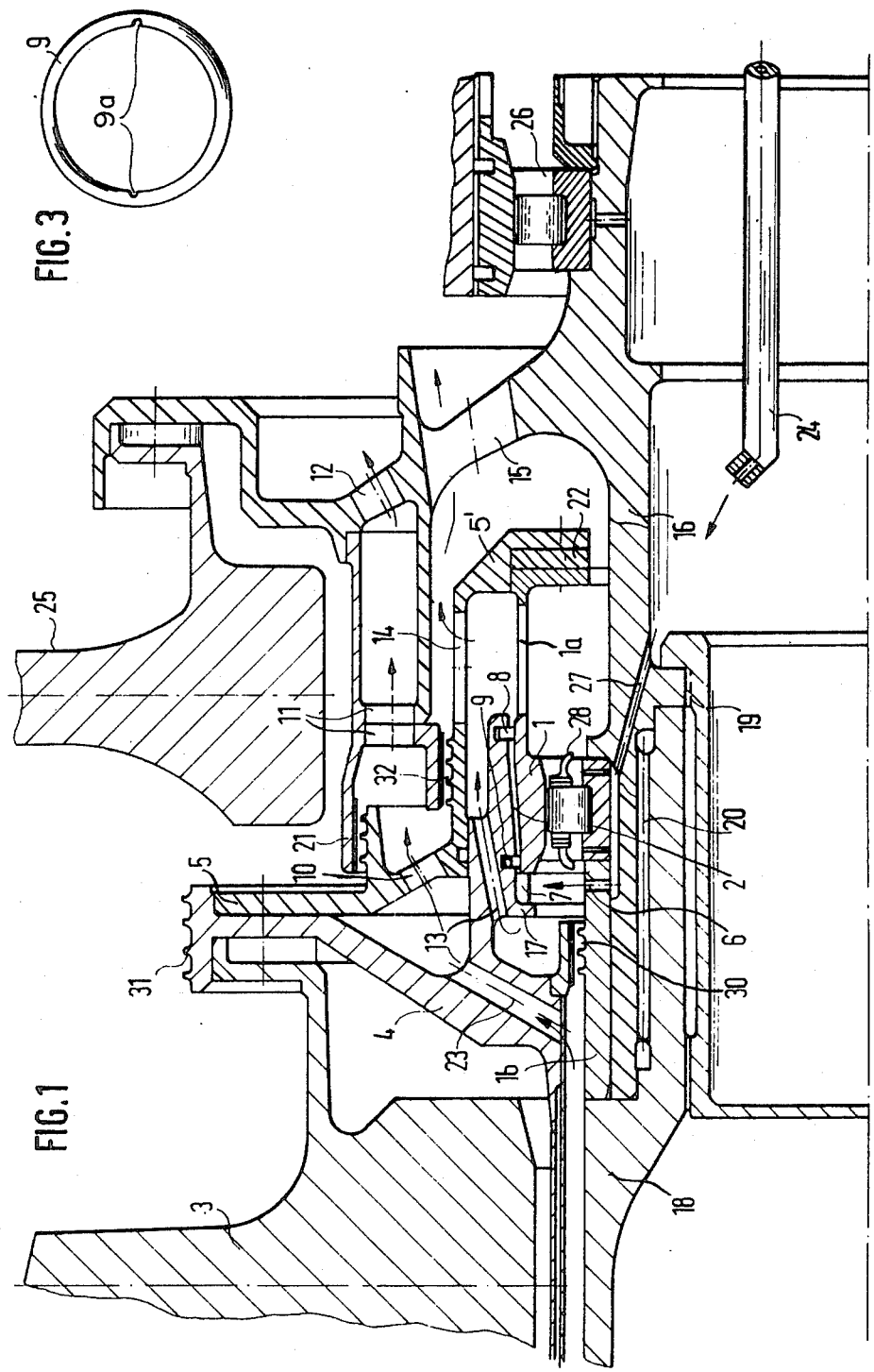
FIG. 1 is a sectional view through the interface between a high pressure turbine and a low pressure turbine showing a ring gap between the outer race of a squirrel cage bearing and a mounting member connected to the high pressure turbine shaft.

FIG. 1 shows a squirrel cage bearing 1 secured to the high pressure components of the system. The squirrel cage bearing 1 has outer bearing race elements 1a and inner bearing race elements 1b. A fluid gap 2 required for the squeeze film damping of the squirrel cage bearing 1 is formed between a mounting member 4 secured to the high pressure turbine 3, and the outer race 1a of the squirrel cage bearing 1. The outer ring 1a of the squirrel cage bearing 1 is held in place by a mounting ring 5 also secured to the high pressure turbine 3 and having an extension 5'.

The fluid needed for the damping is supplied through a bore 6 and entrapped in a ring space 7 formed by a lip 17 of the mounting member 4 and the axially facing end portion of the outer race 1a of the squirrel cage bearing 1. It is not simple to supply the rotating system with oil under pressure. Therefore, the oil pressure required for forming a damping layer in the gap 2 is generated by the centrifugal force resulting from the high r.p.m. of the high pressure turbine shaft which rotates the entrapment chamber 7.

The damping gap 2 is normally cylindrical. However, by making the damping gap slightly conical as shown, it is possible to increase the through-flow of oil through the damping gap 2 with the aid of the centrifugal force. The oil pressure needed in the gap 2 for achieving an effective damping, is controlled by the two flow quantity rings 8 and 9, one of which is arranged at each end of the damping gap 2. Each control ring 9 comprises openings 9a as shown in FIG. 3. These openings 9a permit the entry and exit of the fluid into the damping gap 2. The damping characteristic of the damping gap 2 is controllable by the tolerance provided between the size of the control ring 8 in its respective groove or by providing the control ring 8 with the appropriate number of openings 9a. Under certain circumstances it is possible to just use the lubricating oil coming out of the bearing 1 for the present damping purposes. In any event, each ring 8 and/or 9 may be used for the control.

The bores 23, 10, 11, and 12 provide a cooling air flow channel around the bearing chamber in which the bearing 1 is located. The bores 13, 14, and 15 provide a flow channel for the oil return.

The lubricating oil for the bearing 1 is supplied through a nozzle 24 spraying the lubricating oil into a bore 27 passing through the low pressure turbine cone 16 into a ring space below the inner race of the squirrel cage bearing 1. The shaft 18 of the low pressure turbine and the cone 16 of the low pressure turbine shaft 18 are connected to each other by a nut 19, whereby the torque transmission passes through gear teeth 20.

A labyrinth type sealing ring 21 is secured to the low pressure shaft cone 16 by conventional flange means. A spacer disk or ring 22 between the outer race member 1a of the squirrel cage bearing 1 and the mounting cone extension 5' has a thickness which determines the width of the damping gap 2 if the damping gap 2 has the shown conical configuration. Thus, by selecting the proper thickness of the spacer ring 22, the gap width may be determined. The spacer ring 22 is made of, for example, metal, carbon, or ceramic. However, other means may be used for determining the width of the gap 2. For example, a fine threading between the mounting cone 5 and the other components to which the mounting cone 5 is secured, may be used for the adjustment of the gap width of the damping gap 2. Incidentally the fluid flow control rings 8, 9 are made of metal, such as a high alloy steel.

A further bearing 26 constructed as the squirrel cage bearing 1 is located at the righ-hand end of the low pressure conical mounting member 16. Although not shown, the bearing 26 also has a squirrel cage 28 as shown in the bearing 1.

Figure 2:
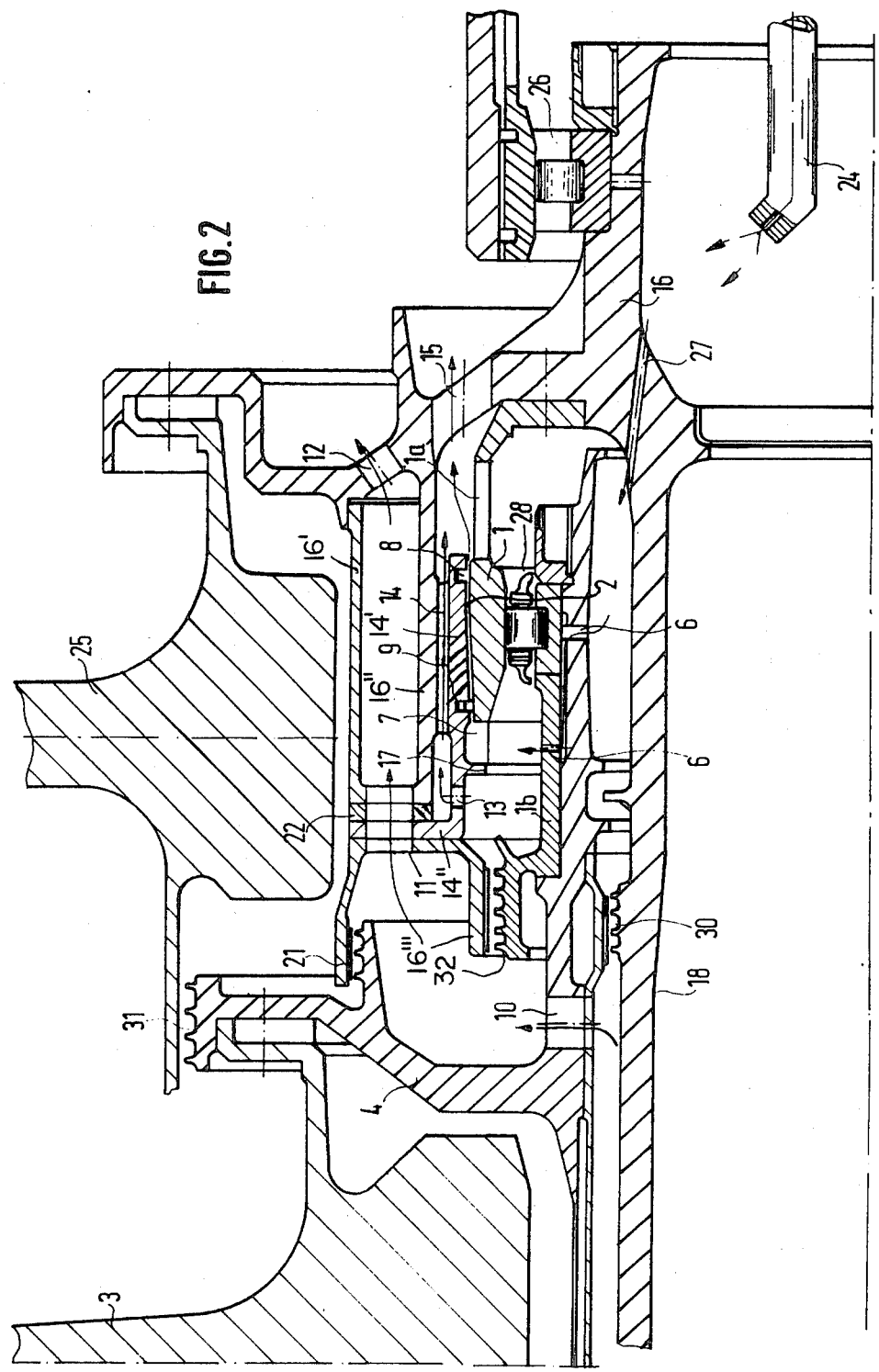
FIG. 2 is a sectional view similar to that of FIG. 1, however, the ring gap is now formed between the outer race or ring of the squirrel cage bearing and a mounting member connected to the low pressure turbine shaft.

FIG. 2 shows that the squirrel cage bearing 1 with its squirrel cage 28 is mounted between the cone member 16 of the low pressure turbine shaft 18 and the shaft of the high pressure turbine 3. The low pressure turbine member disk 25 is also connected to the conical mounting member 16 of the low pressure turbine.

The fluid supply for the damping gap 2 in FIG. 2 is achieved similarly as in FIG. 1, whereby fluid from the nozzle 24 passes through the channel 27 and through the bores 6 into the entrapment chamber 7. However, it is also possible to use exclusively lubricating oil of the bearing 1 for providing the required damping oil layer in the gap 2. The pressure generation again is accomplished in the space 7 between the lip 17 and the facing end of the bearing 1 by the rotation of the chamber 7 with a bearing mounting member 14' secured to a mounting bushing 16' and an extension 16" of the mounting cone 16 with the aid of a flange ring 16'" screwed to the bushing 16'.

The fluid return flow passes through a bore 13, through slots 14, and through bores 15. The slots 14 are provided between the member 14' and the extension 16"

forming part of the low pressure turbine cone 16. The gap 2 is formed between the outer race 1a and the mounting member 14'. The bores 15 are provided in the mounting cone 16 of the low pressure turbine for returning the fluid back to the nozzle 24 in a closed circuit. Again, bores 10, 11, and 12 provide a passage for cooling air flowing around the bearing chamber. A labyrinth ring 21 provides a seal between the bushing 16' screwed as an extension to the conical mounting member 16, and the mounting conical member 4 of the high pressure turbine 3. Further, labyrinth seals also of conventional construction are shown at 30, 31, and 32.

The above mentioned spacer ring 22 is located in FIG. 2 between the extension 16" of the cone member 16 and a flange 14" of the mounting member 14' of the low pressure turbine 3, whereby again, the gap width of the gap 2 can be determined by selecting a spacer ring 22 from a group of rings having different thicknesses.

Incidentally, the fluid passage bores 6 are provided in a shaft portion of the high pressure turbine shaft in FIG. 2, while in FIG. 1 these bores are provided in a portion forming part of the low pressure turbine shaft.

In the preferred embodiment, the damping of the squirrel cage bearing which is oil lubricated, is accomplished by oil passing through the gap 2. The squirrel cage bearing or rather its outer race rotates either with the r.p.m. of the high pressure turbine shaft while the supply of the damping fluid is accomplished through a channel passing through the low pressure turbine shaft 18 as shown in FIG. 1 or vice versa as shown in FIG. 2. Such high pressure, low pressure turbine combinations are used in turbo engines, especially multi-stage turbines of the type used in aircraft jet engines.

The squirrel cage 28 should preferably be made of a material which has spring elastic characteristics in the radial direction. Such bearings are readily available on the market. While it has been found that oil is a suitable medium for damping the intermediate bearing, the invention is not intended to be limited to the use of oil for this purpose.

While it is simple and effective to modify the damping characteristic by changing the gap width of the gap 2 with the aid of the above mentioned spacer rings 22, other means for modifying the damping characteristics may be employed. For example, the quantity of damping medium such as oil passing through the damping gap 2, may be changed, for example, by using for different damping effects, different control rings 8, 9, with different holes 14 or with different tolerances in the respective control ring grooves. These openings 14 and the respective tolerances may differ from each other. In other words, the ring 8 may have different openings and tolerances than the ring 9. Even during the operation of the turbine, the damping characteristic could be modified, for example, by hydraulic, pneumatic, electric, or magnetical means.

Compared to the above discussed prior art, the invention achieves the following advantages. The spring in parallel with the squeeze film as advocated by Hibner et al are avoided altogether. Thus, it is no longer necessary to meet the very narrow and hence critical spring characteristic requirements. For instance, the spring stiffness must satisfy a very narrow tolerance in the Hibner et al system. Further, in systems using springs in parallel to the squeeze film additionally dampers must be used for protecting the springs against alternating loads in operation. The invention, for the first time, compensates for unbalances of the rotor and/or the shaft solely with the aid of a squeeze film bearing which is also capable of taking up or accommodating axial displacements of the shaft and rotor.

Other advantages are seen in that the damping characteristic of the squeeze film bearing placed as taught by the invention, can be controlled by simple means such as the following varying the shaft or r.p.m., changing the relative r.p.m. between two shafts, modifying the flow speed and/or flow quantity of the oil passing through the gap in which the squeeze film is formed, changing the composition and/or characteristics of the oil passing through the gap, such as the viscosity, the temperature, the air entrainment and the like. Further control possibilities are provided by restricting the flow passage cross-sectional area at the rings 8, 9 by using rings having different opening sizes 9a, and by changing the width of the gap 2 by axially displacing the conical components 1 and/or 4, 14'. This displacement may be accomplished by using, at different times, spacer rings 22 of different thicknesses. However, these components 1 and/or 4, 14' can also be displaced axially during the operation, for example by hydraulic pressure.

Although the invention has been described with reference to specific example embodiments, it will be appreciated, that it is intended to cover all modifications and equivalents within the scope of the appended claims.

What we claim is:

1. An apparatus for damping vibrations in a fluid flow engine, comprising shaft means for supporting engine components, bearing means including an inner bearing race, and an outer bearing race having an outer surface, mounting means for said bearing means having an inner surface facing said outer surface, said outer surface having a smaller diameter than said inner surface for forming a damping gap between said inner and outer surfaces, said damping gap having a fluid flow gap entrance end and a fluid flow gap exit end, fluid flow entrapment chamber means formed around said gap entrance end for accumulating damping fluid in said chamber means, and means for directing a damping fluid flow through said entrapment chamber means into said damping gap, whereby rotation of said entrapment chamber means compresses damping fluid into said damping gap by centrifugal force.

2. The apparatus of claim 1, wherein said fluid flow engine comprises a high pressure section having a first shaft rotating at a first r.p.m. and a low pressure section having a second shaft rotating at a second r.p.m., said bearing mounting means being connected to said first shaft of said high pressure section, whereby said entrapment chamber means rotates with said first r.p.m. for producing said centrifugal force which presses damping fluid through said damping gap.

3. The apparatus of claim 1, wherein said fluid flow engine comprises a high pressure section having a first shaft rotating at a first r.p.m. and a low pressure section having a second shaft rotating at a second r.p.m., said bearing mounting means being connected to said second shaft of said low pressure section, whereby said entrapment chamber means rotates with said second r.p.m. for producing said centrifugal force which presses damping fluid through said damping gap.

4. The apparatus of claim 1, wherein said fluid flow engine comprises a high pressure section having a first shaft and a low pressure section having a second shaft, said apparatus further comprising damping fluid flow channel means passing through said second shaft of said low pressure section for supplying damping fluid into said entrapment chamber means.

5. The apparatus of claim 1, further comprising means for controlling a quantity of damping fluid flowing through said damping gap, said means for controlling comprising a number of rings (8, 9) arranged in said damping gap for partially closing said gap.

6. The apparatus of claim 5, wherein said number of rings comprises two rings one ring being arranged at said gap entrance end, the other ring being arranged at said gap exit end, each ring having a different tolerance relative to dimensions of said damping gap for controlling said damping fluid quantity to form a bearing film of damping fluid in said damping gap.

7. The apparatus of claim 5, wherein said rings (8, 9) have openings (14) therein for controlling the quantity of damping fluid.

8. The apparatus of claim 1, wherein said bearing means comprise a roller cage bearing.

9. The apparatus of claim 1, wherein said outer surface of said outer bearing race is a first conical surface, and wherein said inner surface of said bearing mounting means is a second conical surface surrounding said first conical surface to enclose said damping gap between said first and second conical surfaces.

10. The apparatus of claim 9, further comprising means (22) for selecting different widths for said damping gap by axially displacing at least one of said mounting means and said outer bearing race.

11. The apparatus of claim 1, further comprising means for flowing a cooling medium about said bearing means.

12. The apparatus of claim 1, further comprising means for controlling a width of said damping gap during operation of said fluid flow engine for varying a damping characteristic of said damping gap.

* * * * *